(Model.)

P. C. MATHERSON.
PRUNING SHEARS.

No. 340,230. Patented Apr. 20, 1886.

2 Sheets—Sheet 1.

Witnesses.

Inventor:
Peter C. Matherson
by his Atty's
Brown & Hall

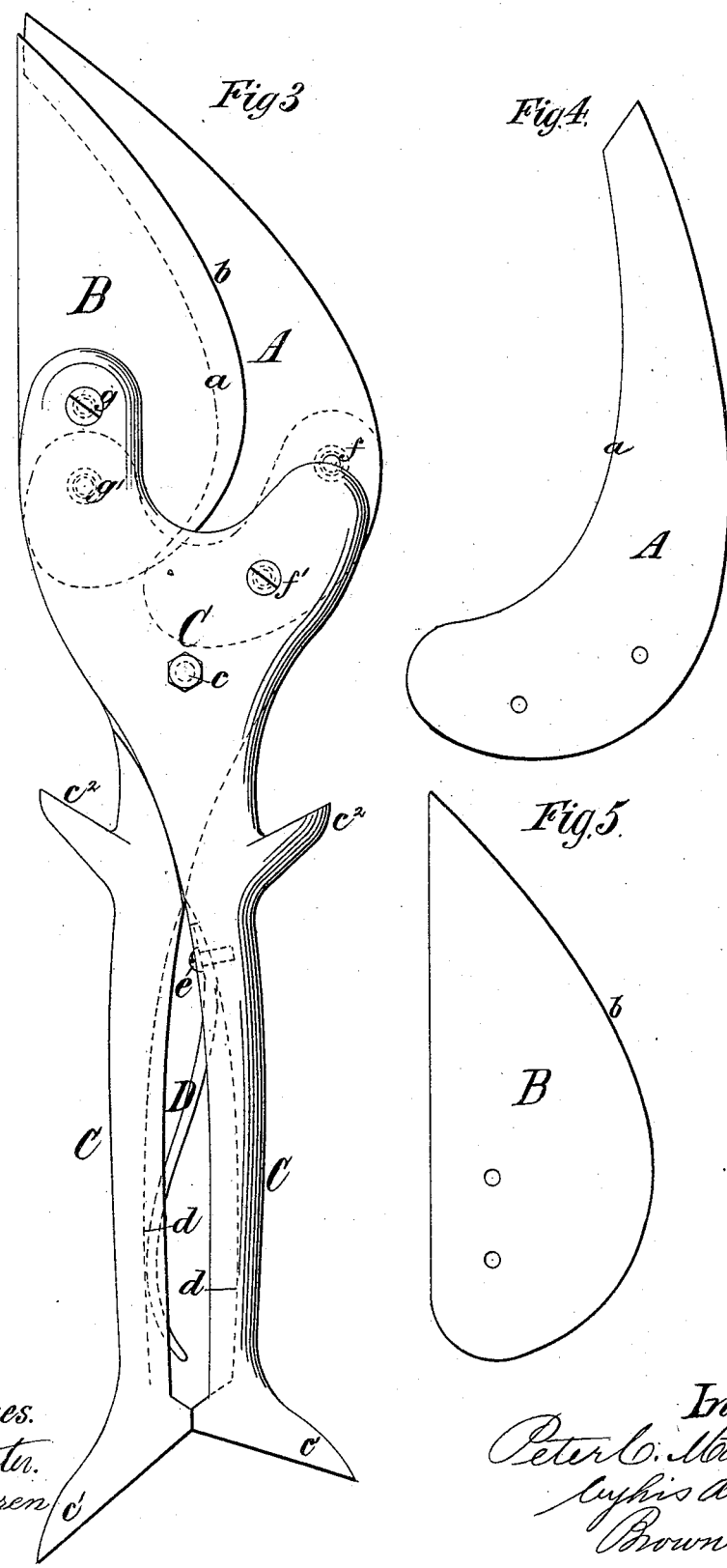

UNITED STATES PATENT OFFICE.

PETER C. MATHERSON, OF BROOKLYN, ASSIGNOR OF ONE-FOURTH TO AMELIA F. SCOTT, OF NEW YORK, N. Y.

PRUNING-SHEARS.

SPECIFICATION forming part of Letters Patent No. 340,230, dated April 20, 1886.

Application filed December 3, 1885. Serial No. 184,563. (Model.)

*To all whom it may concern:*

Be it known that I, PETER C. MATHERSON, of the city of Brooklyn, in the county of Kings and State of New York, have invented a new and useful Improvement in Shears for Pruning and other Purposes, of which the following is a specification.

My invention is more particularly intended for pruning-shears, but may be embodied in shears for cutting metal and in other similar shears or cutting implements having two blades or cutters and two lever-like handles which are moved toward each other or brought together to produce the cutting action of the blades.

In shears as usually constructed the handles or levers, in order to produce an adequate opening of the blades, have to be opened so far that they cannot be readily grasped in the hand, and the muscles of the hand are strained and cannot exert the proper action upon the handles or levers to cut with most effect. Consequently the use of such shears for pruning purposes is very laborious, and the muscles of the hand soon become so strained and relaxed that the shears cannot be effectively used, if at all. Moreover, in the ordinary shears the blades have a tendency as they close to crowd out the stem or branch or the metal from between them, and consequently their efficiency is impaired.

The objects of my invention are to provide shears in which the handles or levers are not so far spread apart when the blades are open or separated, and in which the blades or cutters exert a drawing action on the article or material placed between them to enter it still farther between them, and are therefore more effective.

The invention consists in novel combinations of the blades or cutters and handles or levers, as hereinafter described, and pointed out in the claim.

Figure 1:
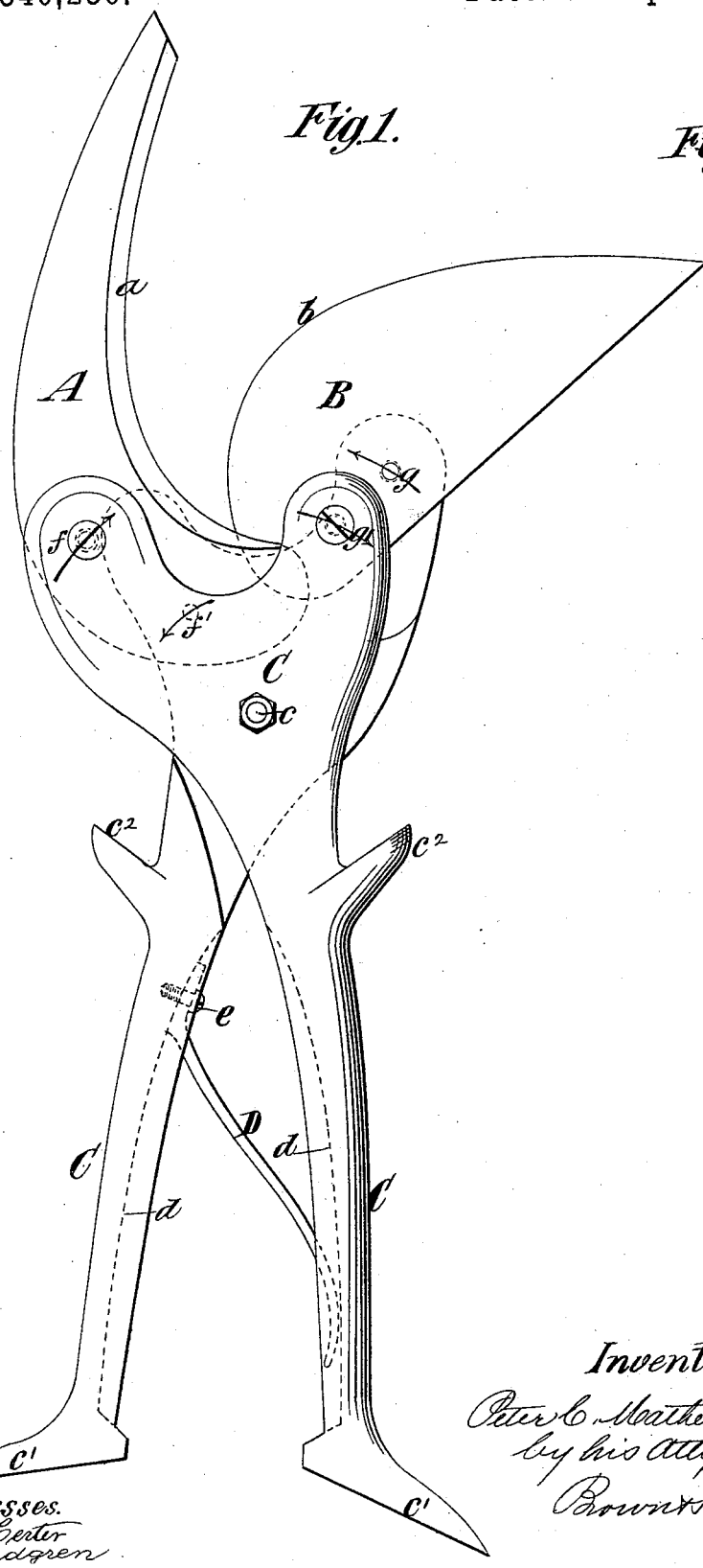
Figure 2:
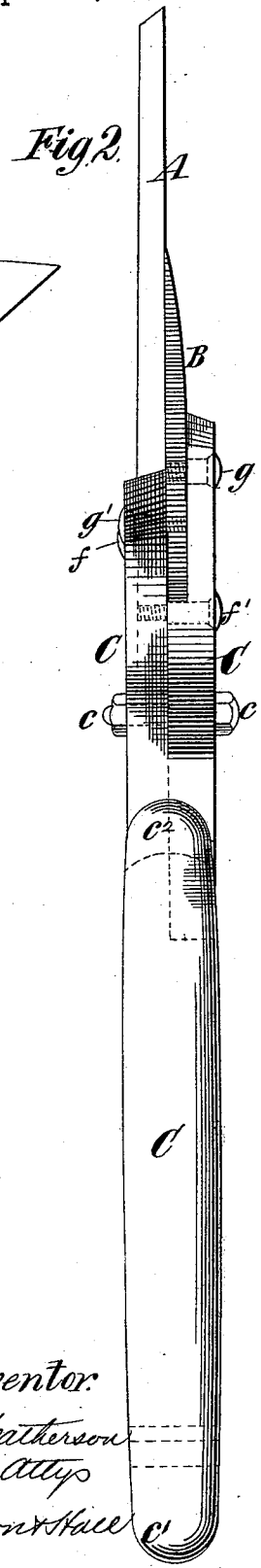

In the accompanying drawings, Figure 1 represents a pair of pruning-shears embodying my invention, the blades being spread apart or opened. Fig. 2 represents an edge view of the shears. Fig. 3 is a view similar to Fig. 1, showing the blades closed; and Figs. 4 and 5 represent the two blades or cutters detached from the handles or levers.

Similar letters of reference designate corresponding parts in all the figures.

A and B designate the two blades or cutters, the former of which has a concave cutting-edge, $a$, and constitutes the horn of the shears, and the latter of which has a convex cutting-edge, $b$, and operates in conjunction with the horn.

The blades are operated by two handles or levers, C, which are pivoted or fulcrumed at $c$ by a bolt or pin, and are shown as substantially like in shape. Each handle C has at the end a toe or projection, $c'$, to prevent the hand from slipping off them, and each has near its pivot a horn or projection, $c^2$, which forms a finger-rest in operating two shears. As each handle has a finger-rest, $c^2$, the shears may be used with equal convenience whichever handle is held by the hand between the thumb and first finger, the other handle being held by the fingers.

The handles C each have a groove or channel, $d$, in the inner side, and between them is a spring, D, for spreading the handles, the spring being fastened at $e$ in the groove in one handle, and bearing at the opposite end in the groove of the other handle.

An important feature of my invention is that the handles or levers are provided with extensions beyond the pivot $c$, which connects them, and that the blades are each of them pivoted to the extensions of both handles at points beyond or forward of the pivot $c$, which connects the handles, and consequently the fulcrum-point of each blade is movable. The blade or horn A is pivoted at $f$ to one handle C and at $f'$ to the other handle, and the blade B is pivoted at $g$ to one handle and at $g'$ to the other handle.

From Fig. 1 it will be seen that when the blades are fully spread or opened the handles C are not greatly spread, but are so near together that they may be grasped in the hand without straining the muscles and operated or brought together with great power. The use of the shears will not, therefore, fatigue the muscles as do the ordinary shears, and they may be used far more effectively and for a longer time continuously.

When the handles are brought together the several pivots $f f' g g'$ move in the opposite directions, (indicated by the arrows, Fig. 1,) and the blades make a drawing cut as they come together, and their cutting-edges make a very small angle with each other; or, in other words, come together almost simultaneously through their whole length. The blades therefore tend to draw inward between them the article or material to be cut, and do not tend to expel the article or material from between them. The several pivots $f\,f'\,g\,g'$ may advantageously consist of screws, which turn in their holes in the handles, and are threaded into the blades and shouldered near the end, so that the shoulders come to a bearing on the blade and avoid clamping the blade to the handle.

I am aware of Patent No. 326,314, granted September 15, 1885, to J. M. McKay, and I do not desire to include in my invention anything therein shown or described. My shears differ essentially from those shown in that patent. In my shears the pivotal connections of each blade with the handles are forward of or beyond the pivot $c$, which connects the handles, and consequently when the handles are closed the two pivots of each blade $f\,f'$, for example, are moved in opposite directions, thereby giving a large movement of the blades with a comparatively small movement of the handles. In the McKay patent one pivotal connection of each blade with the handles is rearward of or behind the pivot which connects the handles, and consequently when the handles are closed the two pivotal points of each blade are moved in the same direction. Because of this feature in McKay's shears he is obliged to slot each blade to receive one of its pivots, while my blades have no slots, but are formed with round holes to receive all of their pivots.

I am also aware of Letters Patent No. 142,886, granted September 16, 1873, to Baker, and I do not claim the shears shown therein as included in my invention. In the shears shown in said patent the blade is pivotally connected with the two handles or levers at points which are beyond or outward of the pivot connecting said handles or levers, and such blade operates in connection with the hook, which forms a rigid extension of one of the handles or levers, and hence is not included in my invention.

What I claim as my invention, and desire to secure by Letters Patent, is—

The combination, with two handles pivoted together and having extensions beyond or forward of the pivot which connects them, of two blades or cutters each pivoted to the extensions of both handles at points forward of or beyond the pivot which connects the handles, whereby the pivotal points of each blade are moved in opposite directions by the closing of the handles, substantially as herein described.

PETER C. MATHERSON.

Witnesses:
M. LINDEMAN,
FREDK. HAYNES.